Jan. 4, 1938.     T. H. MILLER     2,104,307

METHOD OF FORMING END GRAIN FLOORING

Filed Nov. 4, 1935

INVENTOR
Theodore H. Miller
BY
ATTORNEY

Patented Jan. 4, 1938

2,104,307

UNITED STATES PATENT OFFICE 2,104,307

METHOD OF FORMING END GRAIN FLOORING

Theodore H. Miller, Portland, Oreg.

Application November 4, 1935, Serial No. 48,118

1 Claim. (Cl. 20—75)

This invention relates generally to the lumber industry and particularly to the manufacture of end grain flooring strips.

The object of the invention is to accomplish the manufacture of end grain flooring most economically while producing a form of end grain flooring least subject to distortion, as resulting from the shrinkage or expansion of the individual flooring blocks. A secondary object is the manufacture of an end grain flooring of pleasing design.

These and other objects will become more apparent from the specification as illustrated by the accompanying drawing, in which.

Figure 1:
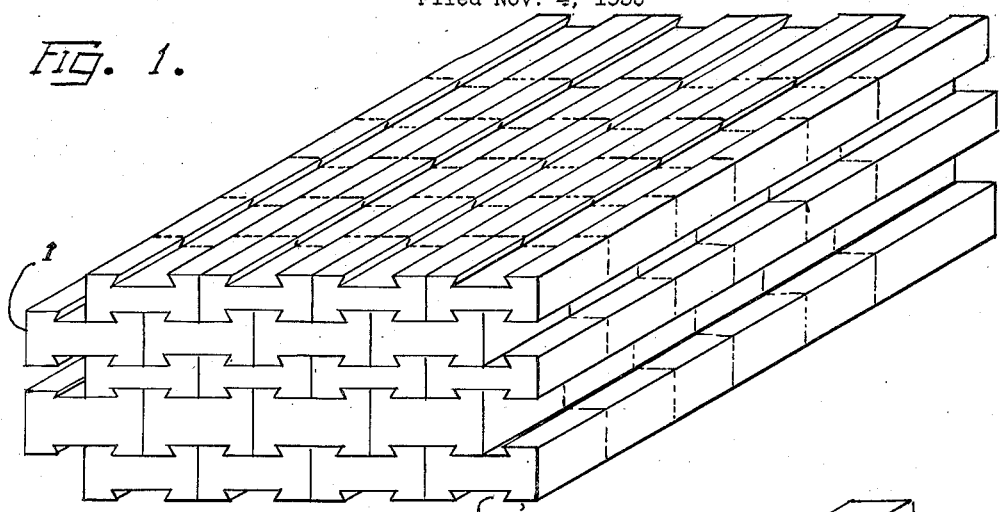
Figure 1 is a view of a panel composed of a number of slidably interlocked lumber strips, in a number of courses of varied thickness.
Figure 2:
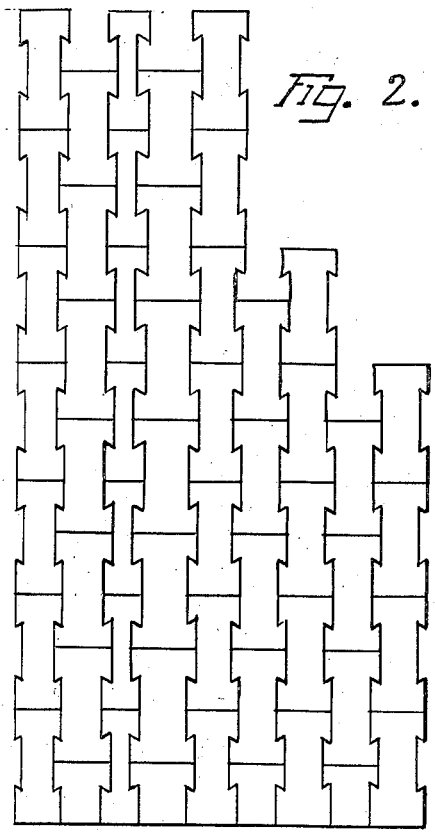
Fig. 2 is a view of a floor section made of end grain flooring strips obtained by cross cutting the panel shown in Fig. 1 as indicated by the dotted lines.
Figure 3:
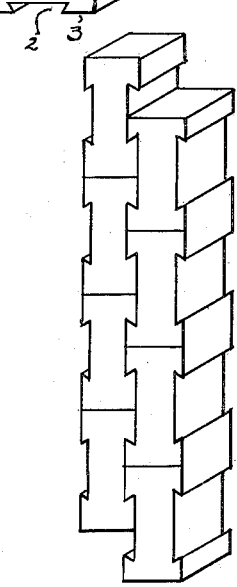
Fig. 3 is an end grain flooring strip composed of two courses of end grain flooring blocks.
Figure 4:
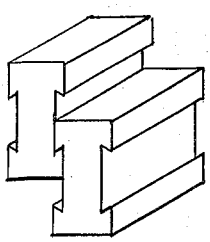
Fig. 4 illustrates the manner in which two end grain flooring blocks are joined, becoming interlocked with the addition of a third block.

Similar numerals refer to like parts thruout the several views and the numeral 1 refers to a lumber strip having joinder elements formed on the opposed faces thereof, said joinder elements being interlocking and consisting of an oppositely positioned pair of dove tail grooves 2 flanked on either side by a pair of oppositely positioned half dove tail projections 3, of such size that when two of said projections are placed side by side they together form a complete dovetail suitable to engage with the dove tail groove 2 of a third strip 1. A number of said strips 1 may be slidably joined and interlocked to form a panel (Fig. 1) of such width and thickness as desired. It should be noted that the joinder elements herein shown may be modified to the form of those shown in my application Number 17,462 filed April 20, 1935 or to a number of equivalent recess and projection types of joinder means.

When the strips 1 have been combined to form the panel (Fig. 1) said panel may be cross cut as indicated by the dotted lines shown in Fig. 1 and the resultant sections when turned on end will constitute as many strips of end grain flooring. In like manner end grain flooring strips may be obtained of such depth as desired by varying the length of the sections cut from said panel.

End grain flooring strips as above obtained may be slidably joined edge and end to form flooring strips of larger size and may be joined edge and end in like manner to form flooring sections of such dimensions as desired while subdivisions or individual blocks are easily fitted into small spaces in terminating said flooring section. It is also apparent that individual blocks may be removed from the floor and blocks of contrasting color or grain substituted to render enhanced design.

As end grain flooring is now manufactured it must either be installed a block at a time or in strips as is the case where single blocks are bound to an undercourse strip or joined by means of lateral dowel or spline joining means. In the former case the cost of installation is heavy and in the latter case the cost of fabrication is high as in both cases the blocks must be handled individually.

The novelty of my end grain flooring is apparent in that the joinder means are perpendicular, permitting the rapid and economical manufacture of end grain flooring strips, as the stock is machined but once on standard high speed planers in combination with a dove tail cutting attachment as covered by my application Number 715,154 filed March 12, 1934. The stock is machined in regular commercial lengths. In contrast to this, conventional end grain flooring requires one surfacing operation to size the blocks, a cross cutting operation to reduce them to proper length, and a further machining of them in end grain position so as to provide them with lateral joinder elements suitable to their assembly in strip form.

It should also be noted that my method makes the use of comparatively thin lumber more feasible. As this is naturally more uniformly dried than thicker stock it is apparent that flooring asembled therefrom is less subject to distortion as resulting from shrinkage while the flooring composed of the consequent greater number of pieces offers greater chance of absorbing any swelling of individual blocks without distortion.

Having thus described my invention I claim:

A method of forming end grain flooring consisting of first forming the lumber into elongated strips, then forming interlocking dovetail joinder elements on the opposed faces of the strips, then combining the strips into panels of two or more courses, then crosscutting the panels to form strips of end grain flooring blocks, the sides and ends of said blocks having joinder elements formed thereon whereby they may be united to adjacent faces by a vertical sliding movement.

THEODORE H. MILLER.